United States Patent
Inoue et al.

(10) Patent No.: US 8,628,889 B2
(45) Date of Patent: Jan. 14, 2014

(54) OPERATING METHOD OF ANION-EXCHANGE MEMBRANE-TYPE FUEL CELL

(75) Inventors: Hiroshi Inoue, Tsukuba (JP); Shin Watanabe, Tsukuba (JP); Kenji Fukuta, Tsukuba (JP); Hiroyuki Yanagi, Tsukuba (JP)

(73) Assignee: Tokuyama Corporation, Yamaguchi (JP)

( * ) Notice: Subject to any disclaimer, the term of this patent is extended or adjusted under 35 U.S.C. 154(b) by 110 days.

(21) Appl. No.: 13/123,246

(22) PCT Filed: Oct. 6, 2009

(86) PCT No.: PCT/JP2009/067377
§ 371 (c)(1),
(2), (4) Date: Apr. 8, 2011

(87) PCT Pub. No.: WO2010/041642
PCT Pub. Date: Apr. 15, 2010

(65) Prior Publication Data
US 2011/0195323 A1  Aug. 11, 2011

(30) Foreign Application Priority Data

Oct. 10, 2008 (JP) ................................. 2008-263700
Dec. 19, 2008 (JP) ................................. 2008-324178

(51) Int. Cl.
*H01M 8/04* (2006.01)
*H01M 8/10* (2006.01)
*H01M 8/00* (2006.01)

(52) U.S. Cl.
USPC ............ 429/444; 429/428; 429/492; 429/535

(58) Field of Classification Search
None
See application file for complete search history.

(56) References Cited

U.S. PATENT DOCUMENTS

| | | | |
|---|---|---|---|
| 6,183,914 B1 | 2/2001 | Yao et al. | |
| 7,749,631 B2 | 7/2010 | Abd Elhamid et al. | |
| 2002/0019448 A1 | 2/2002 | Sugaya et al. | |
| 2006/0275643 A1 | 12/2006 | Abd Elhamid et al. | |
| 2007/0141430 A1* | 6/2007 | Huang et al. | 429/34 |
| 2007/0259236 A1* | 11/2007 | Lang et al. | 429/30 |

FOREIGN PATENT DOCUMENTS

| | | | |
|---|---|---|---|
| JP | 11135137 A | 5/1999 | |
| JP | 11273695 A | 10/1999 | |
| JP | 2000331693 A | 11/2000 | |

(Continued)

OTHER PUBLICATIONS

English Abstract of JP 111351 A1.

(Continued)

*Primary Examiner* — Ula C Ruddock
*Assistant Examiner* — Matthew Van Oudenaren
(74) *Attorney, Agent, or Firm* — Cahn & Samuels, LLP

(57) ABSTRACT

A stable, high output is obtained with an anion exchange membrane-type fuel cell that generates electricity when air is supplied. An operating method for an anion exchange membrane-type fuel cell includes an anion exchange membrane electrode assembly for which an anode is joined to one surface of a anion exchange membrane and a cathode is joined to the other surface, and air is supplied to the cathode, wherein air with a reduced carbon dioxide concentration in the atmosphere is supplied to the cathode by a low carbon dioxide air supply system that supplies air with the reduced carbon dioxide concentration to the cathode.

10 Claims, 1 Drawing Sheet

(56) References Cited

FOREIGN PATENT DOCUMENTS

| | | | |
|---|---|---|---|
| JP | 2001-070736 | * | 3/2001 |
| JP | 2001070736 A | | 3/2001 |
| JP | 2002105138 A | | 4/2002 |
| JP | 2002110207 A | | 4/2002 |
| JP | 2002114854 | | 4/2002 |
| JP | 2002367626 A | | 12/2002 |
| JP | 2003243021 A | | 8/2003 |
| JP | 2004206899 | | 7/2004 |
| JP | 2006339145 A | | 12/2006 |
| JP | 2007042617 A | | 2/2007 |
| JP | 200788788 A | | 7/2007 |
| JP | 2007193952 A | | 8/2007 |
| JP | 2009203455 | | 9/2009 |
| WO | WO 2008/054858 A2 | | 5/2008 |
| WO | 2010041641 A1 | | 4/2010 |

OTHER PUBLICATIONS

English Abstract of JP 11273695 A1.
English Abstract of JP 2000331693 A1.
English Abstract of JP 2002367626 A1.
English Abstract of JP 2002105138 A.
English Abstract of JP 2004206899.
English Abstract of JP 2002114854.
English Abstract of JP 2009203455.
English Abstract of JP 2002525803 T.
English Abstract of JP 200788788 A.
English Abstract of JP 2007042617 A.
English Abstract of JP 2001070736 A.
English Abstract of JP 2007193952 A.
English Abstract of JP 2002110207 A.
English Abstract of JP 2003243021 A.
English Abstract of WO 2010041641 A1.
PCT Application No. PCT/JP2009/067337 Translation of the International Preliminary Report on Patentability (Chapter I or Chapter II of the Patent Cooperation Treaty), dated Jun. 16, 2011.
Abstract of JP 2006339145 (A).
English abstract of JP2006339145 (A).

* cited by examiner

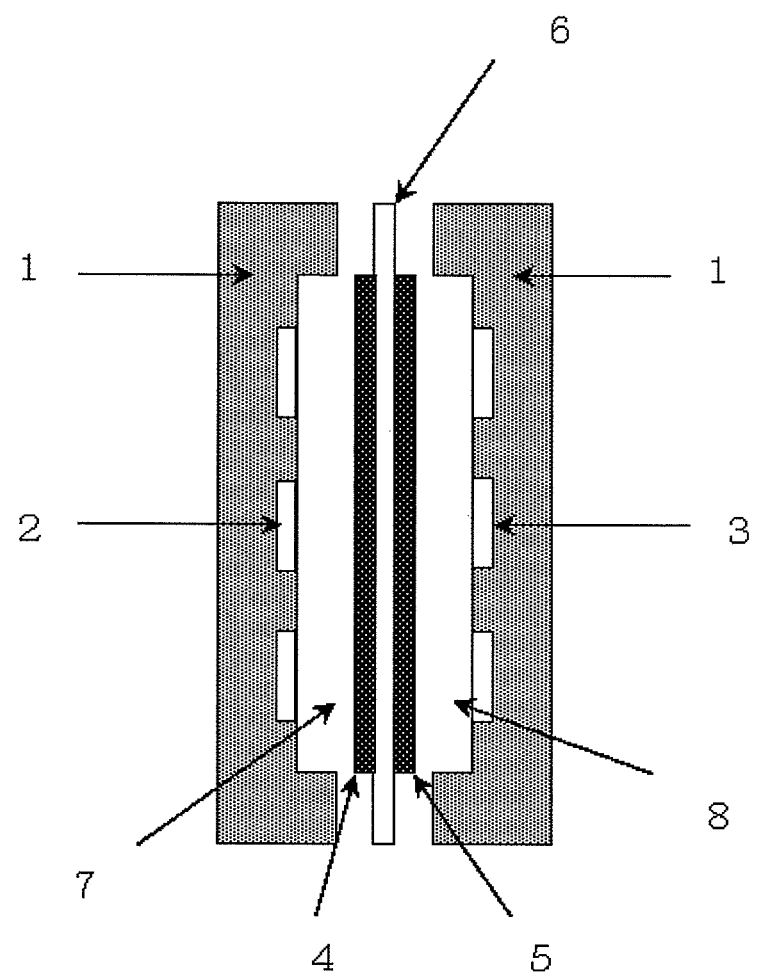

OPERATING METHOD OF ANION-EXCHANGE MEMBRANE-TYPE FUEL CELL

This application is a U.S. national stage application of PCT/JP2009/067377 filed on Oct. 6, 2009 which claims priority of Japanese patent document 2008-263700 filed on Oct. 10, 2008, and Japanese patent document 2008-324178 filed on Dec. 19, 2008, the entireties of which are incorporated herein by reference.

TECHNICAL FIELD

The present invention relates to an operating method for an anion-exchange membrane-type fuel cell comprising an anion-exchange membrane-electrode assembly obtained by joining an anode to one surface of an anion-exchange membrane and joining a cathode to the other surface.

BACKGROUND OF THE INVENTION

A solid polymer type fuel cell uses solid polymer such as ion-exchange resin as an electrolyte, and is characterized by relatively low operating temperature. The solid polymer type fuel cell has, as shown in FIG. 1, a basic structure wherein a space surrounded by cell bulkhead 1 having a fuel flow hole 2 and oxidizing agent gas flow hole 3, respectively communicated with outside, is divided by a membrane assembly in which an anode 4 and a cathode 5 are joined to respective surfaces of a solid polymer electrolyte membrane 6, to form an anode chamber 7 communicated with outside via the fuel flow hole 2 and a cathode chamber 8 communicated with outside via the oxidizing agent gas flow hole 3. Then, in the solid polymer type fuel cell having the above basic structure, a fuel including hydrogen gas or liquid fuel such as methanol, etc. is supplied into the anode chamber 7 via the fuel flow hole 2, and oxygen or oxygen containing gas such as air to act as an oxidizing agent is supplied into the cathode chamber 8 via the oxidizing agent gas flow hole 3. Furthermore, an external load circuit is connected between both gas diffusion electrodes to generate electric energy by the following mechanism.

When using a cation-exchange membrane as the solid polymer electrolyte membrane 6, a proton (hydrogen ion) generated by contacting a fuel with a catalyst included in the electrode in the anode 4 conducts in the solid polymer electrolyte membrane 6 and moves into the cathode chamber 8 to generate water by reacting with oxygen in the oxidizing agent gas in the cathode 5. On the other hand, an electron, generated in the anode 4 simultaneously with the proton, moves to the cathode 5 through the external load circuit, so that it is possible to use the energy from the above reaction as an electric energy.

In a solid polymer type fuel cell wherein a cation-exchange membrane is used for such a solid electrolyte membrane, only an expensive noble metal catalyst is usable as a catalyst in the electrode because of its strongly acidic reaction field Then, it has been examined to use an anion-exchange membrane instead of the cation-exchange membrane, and several of such solid polymer type fuel cells have been already proposed (Patent Articles 1 to 6). In a fuel cell using an anion-exchange membrane, catalysts other than noble metals can be used because the reaction field is basic. However, in this case, a mechanism for generating electric energy in a solid polymer type fuel cell is different in ion species moving through a solid polymer electrolyte membrane 6 as below. Namely, hydrogen or methanol, etc. is supplied to the anode chamber, and oxygen and water are supplied to the cathode chamber, by which the catalyst in the electrode is contacted with the oxygen and water at the cathode 5 to generate hydroxy-ion. This hydroxy-ion conducts in the above anion-exchange membrane as the solid polymer electrolyte membrane 6 and moves into the anode chamber 7 to generate water by reacting with fuel at the anode 4. An electron generated at the anode 4 is moved to the cathode 5 through an external load circuit, and the resulting reaction energy will be used as an electric energy.

In the solid polymer electrolyte type fuel cell using an anion-exchange membrane, it is further expected to greatly reduce crossover that the fuel such as methanol is permeated from the anode chamber side to the cathode chamber side. Furthermore, it is expected that, for example, overvoltage due to oxygen reduction can be reduced; that fuel containing carbon-carbon bond can be used; and that voltage can be improved due to selecting an inactive cathode catalyst to the crossover fuel, because of difference in atmospheres in both electrodes and because of expansion of the scope of available catalyst selection.

So far, it has been proposed for an anion-exchange membrane-type fuel cell to use a membrane obtained by filling up a porous membrane such as woven fabric with hydrocarbon-based cross-linked polymer having an anion exchange group such as quaternary ammonium base and quaternary pyridinium base (Patent Article 1), a membrane obtained by introducing a quaternary ammonium base into hydrocarbon-based engineering plastics followed by casting for film-forming (Patent Article 2), etc., as well as a membrane obtained by graft polymerization of a polymer containing fluorine as a base material with a hydrocarbon-based monomer having an anion-exchange group (Patent Article 3). Also, it is proposed to use a hydrocarbon-based elastomer hardly soluble in water and methanol (Patent Article 4) and resin quaternarized by a quaternarizing agent having a hydroxyl group (Patent Article 5) as an ionomer of a catalyst electrode layer, etc., as well as separation membrane with improved joining property with the catalyst electrode layer by adsorbing resin having a cation-exchange group onto the surface of the anion-exchange membrane (Patent Article 6).

PRIOR ART DOCUMENTS

Patent Articles

[Patent Article 1] Japanese Unexamined Patent Publication No. H11-135137
[Patent Article 2] Japanese Unexamined Patent Publication No. H11-273695
[Patent Article 3] Japanese Unexamined Patent Publication No. 2000-331693
[Patent Article 4] Japanese Unexamined Patent Publication No. 2002-367626
[Patent Article 5] Japanese Unexamined Patent Publication No. 2007-188788
[Patent Article 6] Japanese Unexamined Patent Publication No. 2007-042617

In these anion-exchange membrane-type fuel cells, electricity is generated by supplying air or oxygen to the cathode chamber. The air is practically preferable in view of safety and cost, but is lower in output level than oxygen.

Therefore, it is required to stably obtain higher output when supplying the air, practically preferable in terms of safety and cost, in the anion-exchange membrane-type fuel cell for generating electricity.

SUMMARY OF THE INVENTION

The present inventors have studied variously for attaining high output in terms of an anion-exchange membrane-type fuel cell in which air, practically preferable in safety and cost, is supplied to a cathode chamber. As a result, it was found that the output can be improved by supplying air with a reduced concentration of carbon dioxide to the cathode chamber, and accomplished the present invention.

Namely, the present invention relates to an operating method for an anion-exchange membrane-type fuel cell comprising an anion-exchange membrane-electrode assembly in which an anode is joined to one side of an anion-exchange membrane, a cathode is joined to the other side and air is supplied to the cathode, wherein the air supplied to the cathode is reduced in concentration of carbon dioxide.

According to the operating method for an anion-exchange membrane-type fuel cell of the present invention, it is possible to stably obtain high fuel cell output by using air which is practically preferable as an oxidizing agent gas. Consequently, it is highly useful for practical application of the anion-exchange membrane-type fuel cell having various advantages as mentioned above.

BRIEF DESCRIPTION OF THE DRAWINGS

FIG. 1 is a conceptual diagram showing the basic structure of a solid polymer electrolyte type fuel cell.

DETAILED DESCRIPTION OF THE INVENTION

In the operating method for an anion-exchange membrane-type fuel cell of the present invention, air with a reduced concentration of carbon dioxide is supplied to the cathode of the anion-exchange membrane-type fuel cell comprising an anion-exchange membrane-electrode assembly in which the anode is joined to one side of the anion-exchange membrane and the cathode is joined to the other side. The above concentration of carbon dioxide is preferably reduced to 300 ppm or less.

The air with a reduced concentration of carbon dioxide here is obtained by substantively reducing the concentration of carbon dioxide to preferably 300 ppm or less, more preferably 250 ppm or less, further preferably 100 ppm or less and most preferably 10 ppm or less, in the ordinary air with carbon dioxide concentration of 380 ppm or so. This air with a reduced concentration of carbon dioxide may be obtained by any method as far as it satisfies the above property.

According to the operating method of the present invention, it is possible to improve output of the anion-exchange membrane-type fuel cell by supplying the air with a reduced concentration of carbon dioxide to the cathode. The reason is not fully understood, but the following mechanism can be presumed.

Namely, in the anion-exchange membrane used for the anion-exchange membrane-type fuel cell, even when a counterion of the anion exchange group is preliminarily ion-exchanged into $OH^-$, carbon dioxide in air can be absorbed due to exposure to air before the use as a fuel cell, etc., to rapidly substitute the counterion from $OH^-$ to $CO_3^{2-}$, then from the $CO_3^{2-}$ to $HCO_3^-$.

Even in the case of substituting the counterion of the anion-exchange membrane with $CO_3^{2-}$ or $HCO_3^-$, the $CO_3^{2-}$ and $HCO_3^-$ as the counterion can again be ion-exchanged by $OH^-$ generated in electrode reaction at the cathode chamber side during generating electricity by the fuel cell, and released as carbon dioxide gas outside the system at operation of the fuel cell.

At that time, if directly supplying air to the cathode chamber, carbon dioxide in the air can continuously be absorbed from the surface of the anion-exchange membrane at the side of the cathode, so that a part of the above $CO_3^{2-}$ and $HCO_3^-$ as the counterion may remain without ion-exchanging to $OH^-$. In the fuel cell with remaining $CO_3^{2-}$ and $HCO_3^-$ as the counterion of the anion-exchange membrane, ion conductivity of the anion-exchange membrane is lower than in an anion-exchange membrane in which all counterions are $OH^-$, and also is low in concentration of $OH^-$ as an electrode reactive species and in basicity in the electrode reaction field, so that overvoltage is also larger than in the anion-exchange membrane in which all counterions are $OH^-$. Therefore, the output is low compared to a fuel cell using the anion-exchange membrane in which all counterions are $OH^-$.

On the other hand, in the operating method in which the air with a reduced concentration of carbon dioxide is supplied to the cathode chamber as in the present invention, it is estimated to improve fuel cell output because the concentration of $OH^-$, generated by ion-exchanging again in the above-mentioned mechanism, can be increased as a result of decrease in an amount of carbon dioxide absorbed in the anion-exchange membrane at the cathode side during operation.

The concentration of the carbon dioxide in the air supplied to the cathode chamber is preferably 300 ppm or less, more preferably 250 ppm or less, further preferably 100 ppm or less and most preferably 10 ppm or less in view of further improved fuel cell output.

Although commercially-supplied high-purity air in a bomb may directly be used as the air with a reduced concentration of carbon dioxide, it is preferable to supply via a low carbon dioxide air supply system by which air is taken in for reducing carbon dioxide concentration in the air to the desired concentration to supply to the cathode chamber in view of cost and convenience that air with low carbon dioxide concentration can be stably supplied. For the low carbon dioxide air supply system, any system can be used as far as the system has functions to take in air and to reduce concentration of carbon dioxide in the air, followed by supplying the obtained air containing low concentration of carbon dioxide to the cathode, and for reducing the concentration of carbon dioxide, any conventionally known method may be used. For example, there may be mentioned chemical absorption technique using alkaline solution such as aqueous sodium hydroxide solution and aqueous potassium hydroxide solution, or granular soda lime, able to selectively absorb carbon dioxide, membrane isolation process using permselective film to isolate carbon dioxide gas, adsorption method using adsorbent such as zeolite and activated carbon having a lot of fine pores, etc.

The low carbon dioxide air supply system can normally be provided between air-intake and cathode chamber.

In the operating method for an anion-exchange membrane-type fuel cell of the present invention, operating conditions and constitution of the conventionally known anion-exchange membrane-type fuel cell can be employed without any particular limitation except for supplying air with a reduced concentration of carbon dioxide to the cathode as mentioned above.

Namely, as the fuel supplied to the anode chamber, gas fuel such as hydrogen and ammonia, and liquid fuel such as methanol, ethanol, hydrazine and the aqueous solution thereof, in addition to those obtained by mixing the above-mentioned liquid fuel with electrolyte such as sodium hydroxide can be used. Among these, the compounds not containing carbon such as hydrogen, ammonia and hydrazine can preferably be used because of no carbon dioxide generated via anode electrode reaction not to cause the problem that the generated carbon dioxide is absorbed in the anion-exchange membrane. Particularly, due to high reaction activity and high output, hydrogen is most preferable as the fuel supplied to the anode chamber.

When the liquid fuel is used, fuel concentration in the liquid fuel is normally 1 to 100 mass %. Also, the amount supplied to the anode chamber depends on the fuel concentration, and is normally 0.1 to 5 cm$^3$/min per 1 cm$^2$ of electrode area.

When the gas fuel such as hydrogen is used, the fuel may be supplied without humidification, and preferably supplied by using a humidifier and the like at relative humidity of 30 to 100% RH, more preferably 50 to 100% RH, for preventing increased resistance due to drying of the anion-exchange membrane. The amount of the gas fuel supplied to the anode chamber is normally 1 to 100 cm$^3$/min per 1 cm$^2$ of electrode area.

The above air with a reduced concentration of carbon dioxide supplied to the cathode chamber preferably has relative humidity of 30 to 100% RH, more preferably 50 to 100% RH. When the relative humidity is lower than 30% RH, the anion-exchange membrane may be dried to cause high resistance and lowered output. When the atmospheric humidity in operating environment of the fuel cell is within the above range, the above air may either be supplied without humidity regulation, or be humidified and supplied by a humidifier.

The operating temperature of the anion-exchange membrane-type fuel cell of the present invention is normally −30° C. to 120° C., and preferably 20° C. to 90° C. considering high output and durability of used materials.

Also, in the anion-exchange membrane-type fuel cell of the present invention, the anion-exchange membrane may absorb carbon dioxide due to exposure to gas containing carbon dioxide to further ion-exchange the counterion to $CO_3^{2-}$ and $HCO_3^-$ while stopping electric generation. Consequently, it is also effective to stop supplying the air to the cathode, or to substitute the cathode chamber and anode chamber with gas not containing carbon dioxide, while stopping electric generation.

The anion-exchange membrane-type fuel cell in the operating method of the present invention includes an anion-exchange membrane-electrode assembly in which the anode is joined to one side of the anion-exchange membrane and the cathode is joined to the other side. Note that a variety of materials used for the above anion-exchange membrane-electrode assembly and a production method of the assembly are not limited, and any materials and production methods used in conventional polymer electrolyte-type fuel cells can be used without any limitation.

For example, any conventional anion-exchange membrane known to be used in a solid polymer electrolyte membrane for a polymer electrolyte-type fuel cell can be used as the present anion-exchange membrane without limitation. Among these, it is preferable to use a hydrocarbon-based anion-exchange membrane because it can suppress permeability of the fuel including hydrogen gas and liquid fuel such as ethanol, and be inexpensively produced. The anion-exchange membrane including hydrocarbon-based anion-exchange resin may be, for example, an anion-exchange membrane obtained by cast film-forming of hydrocarbon-based anion-exchange resin in which a variety of functional groups is introduced if necessary into engineering plastics material typified by polysulfone, polyether ketone, polyether ether ketone, polybenzimidazole-based polymer and the like.

Preferably, the hydrocarbon-based anion-exchange membrane is an anion-exchange membrane having a porous membrane as a base material in which cross-linked hydrocarbon-based anion-exchange resin is filled in void part of the porous membrane. The anion-exchange membrane in which the cross-linked hydrocarbon-based anion-exchange resin is thus ununiformly dispersed in the porous membrane has an advantage in increasing physical strength of the anion-exchange membrane without sacrificing electric resistance because the porous membrane works as a reinforced section and further advantage in increasing chemical durability. Examples of the anion-exchange membrane may include a membrane obtained by impregnating the void of the porous membrane with a polymerizable monomer composition of chloromethylstyrene and divinylbenzene, of 4-vinylpyridine and divinylbenzene and the like; thermally polymerizing the polymerizable composition; and further introducing the desired anion exchange group through treatment such as amination and alkylation, as disclosed in Japanese Unexamined Patent Publication No. 2007-42617.

As the above porous membrane, thermoplastic resin woven fabric, unwoven fabric, porous film and the like can generally be used, and it is preferable to use a porous film of thermoplastic resin including polyolefin resin such as polyethylene, polypropylene and polymethylpentene, fluorine-based resin such as polytetrafluoroethylene, poly(tetrafluoroethylene-hexafluoropropylene) and polyvinylidene fluoride, etc. as the porous membrane because gas permeability is low and it is possible to form a thin film.

As the anion exchange group present in the anion-exchange membrane, there may be mentioned primary to tertiary amino group, quaternary ammonium base, pyridyl group, imidazole group, quaternary pyridinium base, quaternary imidazolium base, etc. The quaternary ammonium base, i.e. a strongly basic group, is preferable in view of excellent anion conductivity.

The above-mentioned anion-exchange membrane used in the present invention may be any counterion type, and is preferably those in which a part or whole of counterions is ion-exchanged to OH$^-$ type in view of ease of increase in ion conductivity of the anion-exchange membrane, concentration of OH$^-$ which is its electrode reactive species, and basicity in the electrode reaction field. The ion-exchange to the OH$^-$ type can be done by a conventionally known method, i.e. a method in which the anion-exchange membrane is immersed in alkaline solution such as aqueous solutions of sodium hydroxide and potassium hydroxide. Normally, the ion-exchange is done by immersing the membrane in a solution having alkaline concentration of 0.01 to 5 mol/L for 0.5 to 10 hours. It is also effective to repeat the ion-exchange several times. Also, the ion-exchanged anion-exchange membrane is normally washed with water, dried, etc. if necessary before use.

Also, the above counterion of the anion-exchange membrane is preferably $HCO_3^-$, $CO_3^{2-}$, or mixture thereof. Due to such a counterion type, it is possible not only to obtain the anion-exchange membrane having stable membrane characteristic regardless of a degree of absorption of carbon dioxide in air but also to improve stability of the anion exchange group such as quaternary ammonium base. The exchange to the counterion can be done by immersing the anion-exchange membrane in an aqueous solution of, for example, sodium carbonate, sodium bicarbonate and the like as with the ion-exchange to OH$^-$ type.

The anion-exchange membrane used in the present invention normally has anion-exchange capacity of 0.2 to 3 mmol·g$^{-1}$, preferably 0.5 to 2.5 mmol·g$^{-1}$, and also, it is preferable to prepare the same so as to have water content at 25° C. of 7 mass % or more, preferably 10 to 90 mass % or so, for hardly lowering anionic conductivity due to drying. Also, thickness of the membrane is normally preferably 5 to 200 μm, more preferably 10 to 100 μm, in view of achieving low electric resistance and providing mechanical strength required as a support membrane. By having these properties, the anion-exchange membrane used in the present invention normally has membrane resistance of 0.05 to 1.5 O·cm$^2$, preferably 0.1 to 0.5 O·cm$^2$, at 25° C. in 0.5 mol/L-sodium chloride aqueous solution.

The anode and cathode of the anion-exchange membrane-electrode assembly in the present invention are not particularly limited, and conventionally known anode and cathode used for a solid polymer electrolyte type fuel cell can be used without any limitation. The anode and cathode are so called catalyst electrode layers comprising an electrode catalyst and normally further comprising an anion conductive ionomer.

The catalyst electrode layer is obtained by, for example, (I) a method comprising the steps of adding a binding agent and dispersion medium if necessary to the electrode catalyst to form a paste composition, directly shaping the same into a roll or coating the same on a support layer material such as carbon paper followed by heat treatment to obtain a layered product, coating for impregnation of an anion conductive ionomer solution on a surface to become a joining surface to the anion-exchange membrane followed by drying if necessary, and thermal compression bonding with the anion-exchange membrane; or (II) a method comprising the steps of adding an anion conductive ionomer as well as a binding agent and dispersion medium if necessary to the electrode catalyst to form a paste composition, coating the same on a support layer material such as carbon paper or coating the same on a removable film to transfer onto the anion-exchange membrane or directly coating the same on the anion-exchange membrane, followed by drying, and then thermal compression bonding with the anion-exchange membrane if necessary; etc. The above method (II) is more preferable in view of increase in rate of utilization of the electrode catalyst of the catalyst electrode layer.

As the above ionomer, any conventionally known material having an anion exchange group in its molecule and showing anionic conductivity can be used without any limitation.

For example, there may be mentioned resin having a halogenoalkyl group such as chloromethyl group, chloroethyl group, chloropropyl group, chlorobutyl group, chloropentyl group, chlorohexyl group, bromomethyl group, bromo ethyl group, bromopropyl group, bromobutyl group, bromopentyl group, bromohexyl group, iodomethyl group, iodoethyl group and iodobutyl group, specifically resin obtained by amination of polychloromethyl styrene, poly(styrene-chloromethyl styrene) copolymer, polybromoethyl styrene, bromobutyl styrene, chloromethylated polysulfone, chloromethylated polyphenylene oxide, chloromethylated polyether ether ketone and the like, followed by introducing the corresponding anion exchange group.

Alternatively, it is possible to use resin obtained by reacting poly-(4-vinylpyridine), poly-(2-vinylpyridine), poly-vinylimidazole, poly-benzimidazole and the like with an alkylating agent such as methyl iodide, and introducing the corresponding anion exchange group.

Particularly, it is preferable to use a hydrocarbon-based polymer elastomer having an anion exchange group in its molecule and being hardly soluble in water and methanol, as disclosed in Japanese Unexamined Patent Publication No. 2002-367626, considering joining property of the catalyst electrode layer to the above anion-exchange membrane, solvent resistance of the catalyst electrode layer to liquid fuel, etc. as well as operability during the above mentioned production of the catalyst electrode layer.

As the electrode catalyst of the catalyst electrode layer, any known electrode catalyst can be used without particular limitation. Namely, metallic particle such as platinum, gold, silver palladium, iridium, rhodium, ruthenium, tin, iron, cobalt, nickel, molybdenum, tungsten, vanadium or alloy thereof accelerating oxidizing reaction of the fuel such as hydrogen and alcohol and reduction reaction of oxygen can be used without limitation, and it is preferable to use platinum group catalyst due to excellent catalyst activity.

Also, it is possible to use a variety of metal oxides, which are not applicable to conventional strongly acidic proton-exchange membrane, as the electrode catalyst in the anion-exchange membrane. For example, perovskite-type oxide expressed by $ABO_3$ which is excellent in oxidative activity can preferably be used. Specifically, the perovskite type oxide such as $LaMnO_3$, $LaFeO_3$, $LaCrO_3$, $LaCoO_3$ and $LaNiO_3$ can preferably be used as the electrode catalyst as well as those in which A site of the above exemplified oxides is partially substituted by Sr, Ca, Ba, Ce, Ag and the like, and those in which B site of the above exemplified oxides is partially substituted by Pd, Pt, Ru, Ag and the like.

Note that the particle diameter of the electrode catalyst is normally 0.1 to 100 nm, more preferably 0.5 to 10 nm. Although smaller particle diameter results in increased catalyst characteristic, it is difficult to prepare those having a particle diameter of less than 0.5 nm; and when it is more than 100 nm, it is difficult to obtain sufficient catalyst characteristic. Note that the catalyst may preliminarily be supported by a conductive agent. As the conductive agent, any electron conducting substance can be used without particular limitation, and for example, it is common to use carbon black such as furnace black and acetylene black, activated carbon, black lead and the like, either alone or in combination thereof.

Content of the electrode catalyst can be normally 0.01 to 10 mg/cm$^2$, more preferably 0.1 to 5.0 mg/cm$^2$, in terms of the mass of the electrode catalyst per unit area when the catalyst electrode layer is sheet-shaped.

Binding agent can be added to the catalyst electrode layer used in the present invention if necessary. As the binding agent, a variety of thermoplastic resin can be generally used, and the preferably used thermoplastic resin may include polytetrafluoroethylene, polyvinylidene fluoride, tetrafluoroethylene-perfluoroalkyl vinyl ether copolymer, polyether ether ketone, polyether sulfone, styrene butadiene copolymer, acrylonitrile butadiene copolymer, etc. Content of the binding agent can preferably be 5 to 25 wt % of the above catalyst electrode layer. Also, the binding agent may be used alone or in combination of 2 or more.

Also, porous carbon materials, such as carbon fiber woven fabric and carbon paper, can normally be used as the supporting layer material used if necessary for the catalyst electrode layer of the present invention. Thickness of the support layer material is preferably 50 to 300 μm and its porosity can preferably be 50 to 90%. Normally, for forming the catalyst electrode layer, a paste composition containing the above electrode catalyst can be filled within void of the supporting layer material and bonded on the surface of the same such that the obtained catalyst electrode layer has a thickness of 5 to 50 μm.

Also, in the above methods (I) and (II) for producing the catalyst electrode layer, the amount used of the above anion conductive ionomer is not particularly limited, and in the above method (I), it is preferable to apply such that a content of the anion conductive ionomer is 5 to 60 mass %, particularly 10 to 40 mass %, with respect to the catalyst electrode layer in the range of 1 to 50% of the entire thickness based on the joining surface, in view of the effect for giving ion conductivity. Also, in the above method (II), it is preferable to apply such that a content of the anion conductive ionomer is 5 to 60 mass %, particularly 10 to 40 mass %, with respect to the total mass of the catalyst electrode layer.

Furthermore, the thermal compressing for joining the catalyst electrode layer to the anion-exchange membrane in the above methods (I) and (II) can be done with an apparatus able to apply pressure and heat, i.e. hot pressing machine, roll pressing machine and the like. Pressing temperature is generally 80° C. to 200° C. The pressure can depend on the thickness and hardness of the catalyst electrode layer, and normally be 0.5 to 20 MPa.

Thus-produced anion-exchange membrane-electrode assembly can be used by mounting in a solid electrolyte fuel cell having the basic structure as shown in the above FIG. 1.

EXAMPLES

Hereinafter, the present invention will be explained further in detail based on examples, but the present invention is not limited to the examples. Note that operation characteristics of a fuel cell evaluated in examples and comparative examples will be explained below.

1) Measurements of Rate of Counterion Species

Contents of $OH^-$ ion, $CO_3^{2-}$ ion and $HCO_3^-$ ion in an anion-exchange membrane-catalyst electrode assembly were measured to calculate rate (mol %) of each counterion species from each of the obtained counterion content.

Whole measurements of contents of $OH^-$ ion, $CO_3^{2-}$ ion and $HCO_3^-$ ion in the anion-exchange membrane-catalyst electrode assembly were done in a nitrogen-substituted glove box.

Y g of the anion-exchange membrane-catalyst electrode assembly was immersed in 100 ml of 1 mol/L-NaCl aqueous solution for 5 hours or longer. The obtained immersion fluid was titrated with 0.1 mol/L-hydrochloric acid aqueous solution by using 0.1 mol/L-phenolphthalein ethanol solution as an indicator to measure titer (V1 ml) at the end point when the color changed from red to colorless. With this titration, neutralized amount of $OH^-$ ion and converting amount of $CO_3^{2-}$ ion to $HCO_3^-$ ion were measured. Then, the same immersion fluid was added with ethanol solution of a mixture of bromocresol green and methyl red (0.075 mass % of bromocresol green and 0.05 mass % of methyl red) as an indicator, and continuously titrated with 0.1 mol/L-hydrochloric acid aqueous solution to measure titer (V2 ml) at the end point when the color changed from green to orange. With this second titration, neutralized amount of $HCO_3^-$ ion was measured.

Note that the contents of $OH^-$ ion, $CO_3^{2-}$ ion and $HCO_3^-$ ion in the anion-exchange membrane-catalyst electrode assembly can be calculated as below when the titers V1 and V2 satisfy the following relations, respectively, because $OH^-$ ion and $HCO_3^-$ ion never coexist due to the relation of pKa.

(When V1>V2) only $OH^-$ ion and $CO_3^{2-}$ ion are present as ion species.

$CO_3^{2-}$ ion content=0.1×V2/Y[mmol/g]

$OH^-$ ion content=0.1×(V1−V2)/Y[mmol/g]

(When V1<V2) only $CO_3^{2-}$ ion and $HCO_3^-$ ion are present as ion species.

$CO_3^{2-}$ ion content=0.1×V1/Y[mmol/g]

$HCO_3^-$ ion content=0.1×(V2−V1)/Y[mmol/g]

(When V1=V2) only $CO_3^{2-}$ ion is present as ion species.

$CO_3^{2-}$ ion content=0.1×V1/Y[mmol/g]

2) Evaluation of Anion-Exchange Membrane-Type Fuel Cell (Preparation of Anion-Exchange Membrane)

Polyethylene-based porous membrane (where thickness of the membrane was 25 μm, average particle size was 0.03 μm and porosity was 37%) was impregnated with polymerizable monomer composition comprising 97 parts by mass of chloromethylstyrene, 3 parts by mass of divinylbenzene, 5 parts by mass of ethylene glycol diglycidylether and 5 parts by mass of t-butylperoxy ethyl hexanoate. 100 μm-polyester film was used as a remover to coat the both surfaces of the porous membrane, followed by thermal polymerization under nitrogen pressure of 0.3 MPa at 80° C. for 5 hours. The obtained membrane-shaped product was immersed in an aqueous solution including 6 mass % of trimethylamine and 25 mass % of acetone at room temperature for 16 hours, so that an anion-exchange membrane having a quaternary ammonium base as an anion exchange group for a fuel cell was obtained.

The anion-exchange capacity of the obtained anion-exchange membrane was 1.8 mmol/g, water content was 25 mass %, and dried thickness of the membrane was 28 μm.

The anion-exchange membrane was impregnated with 0.5 mol/L of aqueous sodium hydroxide solution to ion-exchange the counterion of the anion exchange group to $OH^-$.

Then, the membrane was left undisturbed in the air for 12 hours or longer to use for fuel cell output evaluation. All counterions of the anion-exchange membrane were converted to $HCO_3^-$ at this time.

(Preparation of Anion-Exchange Membrane-Catalyst Electrode Assembly)

Chloromethylated {polystyrene-poly(ethylene-butylene)-polystyrene} triblock copolymer (Tuftec H1031 made by Asahi Kasei Chemicals Corporation) was immersed in an aqueous solution including 6 mass % of trimethylamine and 25 mass % of acetone at room temperature for 16 hours, and further immersed in 0.5 mol/L-NaOH aqueous solution for 10 hours or longer to synthesize an ($OH^-$ type) anion conductive ionomer for a catalyst electrode layer. The ionomer had a weight average molecular weight of 30,000 and anion-exchange capacity of 1.5 mmol/g-dry resin.

The ionomer was dissolved in 1-propanol in an autoclave at 130° C. for 3 hours to obtain an ionomer solution having a concentration of 5 mass %.

Next, the above ionomer solution was mixed with carbon black, in which 50 mass % of platinum catalyst having average particle diameter of 2 nm was supported, to prepare a composition for forming a catalyst electrode layer. Then, the composition was printed on one surface of the anion-exchange membrane, and dried in the air at 25° C. for 12 hours or longer. Furthermore, the other surface of the anion-exchange membrane was similarly formed with a catalyst electrode layer to obtain an anion-exchange membrane-catalyst electrode assembly. It was controlled such that both surfaces had platinum amount of 0.4 mg/cm$^2$, and ionomer content in the catalyst electrode layer was 30 mass %. Also, the areas of respective catalyst electrode layers were 5 cm$^2$. Note that the counterions of the anion exchange group in the anion-exchange membrane-catalyst electrode assembly were all $HCO_3^-$.

(Fuel Cell Output Test)

On both surfaces of the obtained anion-exchange membrane-catalyst electrode assembly, carbon clothes having a thickness of 300 μm which was treated with polytetrafluoroethylene for water repellent finishing (EC-CC1-060T made by ElectroChem, Inc.) were layered, which was then installed in a fuel cell shown in FIG. 1. Next, the fuel cell temperature was set at 50° C., hydrogen humidified to 95% RH at 50° C. was supplied into the anode chamber at 50 ml/min, and air humidified to 95% RH at 50° C. was supplied into the cathode chamber at 200 ml/min to conduct a generating electricity test. The air used here was obtained by, for example, mixing carbon dioxide in a carbon dioxide bomb with high-purity air to adjust carbon dioxide concentration. At the start of the test and after generating electricity at cell voltage of 0.2V for 2 hours, cell voltage (open-circuit voltage) at current density of 0 A/cm² and cell voltage at 0.2 A/cm² were measured to evaluate the output. Note that carbon dioxide concentration in the air was obtained by providing an FT-IR measurement cell in air supply line to the cathode chamber and evaluating the air flowing thereto with FT-IR.

Example 1

The air having carbon dioxide concentration of 250 ppm was supplied to the cathode chamber to conduct output test. The results are shown in Table 1. Also, the fuel cell after output evaluation was disassembled, and the removed anion-exchange membrane-catalyst electrode assembly was immediately moved into a nitrogen-substituted glove box to measure the rate of counterion species of the anion exchange group in the anion-exchange membrane-catalyst electrode assembly. The results are also shown in Table 1. Note that the rate of counterion species at the start of the output test means the rate of counterion species of the anion exchange group in the anion-exchange membrane-catalyst electrode assembly before it is installed into the cell.

Examples 2 and 3

Changing the carbon dioxide concentration of the air supplied to the cathode chamber to the values shown in Table 1, the output test was conducted and the rate of counterion species was measured as with Example 1. The results are shown in Table 1. Note that for Example 3, the output was also evaluated after generating electricity at cell voltage of 0.2V for 10 hours.

Example 4

300 ml of 0.5 mol/L-aqueous sodium hydroxide solution was put in a gas washing glass bottle, and this was connected in series to the cathode chamber side supply line of the fuel cell shown in FIG. 1 as a low carbon dioxide air supply system. Except for supplying the air in which carbon dioxide concentration was not adjusted directly to the system, output test was conducted as with Example 1. The results of the output test and measurements of the rate of counterion species are shown in Table 1.

Comparative Example 1

The air was supplied directly to the cathode chamber without adjusting the carbon dioxide concentration, and the output test as in Example 1 was conducted. The carbon dioxide concentration in the air was 380 ppm. The results of the output test and measurements of the rate of counterion species are shown in Table 1.

While all counterions in the anion-exchange membrane were $HCO_3^-$ ions at the start of generating electricity, these were substituted to $CO_3^{2-}$ ions and $OH^-$ ions after generating electricity for 2 hours. Also, the lower carbon dioxide concentration in the air resulted in more increased rate of $OH^-$ ions. In Examples 1 to 4, cell voltage (output) at 0.2 A/cm² was higher compared to Comparative Example 1 in which the carbon dioxide concentration was unadjusted. This might be because the higher rate of $OH^-$ ions resulted in improved ion conductivity of the anion-exchange membrane, which further resulted in improved output.

Example 5

The anion-exchange membrane-catalyst electrode assembly was immersed in 2 mol/L-aqueous potassium hydroxide solution for 1 hour, and then immersed in ion-exchange water for 3 hours. The anion-exchange membrane-catalyst electrode assembly was installed in a fuel cell. With carbon dioxide concentration of the air supplied to the cathode chamber of 0.05 ppm, the output test was conducted and the rate of counterion species was measured as with Example 1. The results are shown in Table 1.

Comparative Example 2

Except for supplying the air without adjusting the carbon dioxide concentration directly to the cathode chamber, the output test was conducted and the rate of counterion species was measured as with Example 5. The results are shown in Table 1.

To compare Example 5 and Comparative Example 2, the cell voltage (output) at 0.2 A/cm² after generating electricity at 0.2V for 2 hours was higher in Example 5 than in Comparative Example 2 in which the carbon dioxide concentration was unadjusted. To compare the rates of counterion species, $OH^-$ ions were substituted to $HCO_3^-$ ions and $CO_3^{2-}$ ions in Comparative Example 2 after generating electricity at 0.2V for 2 hours. It would appear that ion conductivity of the anion-exchange membrane was improved in Example 5 because the rate of $OH^-$ ions was higher in Example 5 in which the air of low carbon dioxide concentration was supplied, compared to Comparative Example 2 in which carbon dioxide in the air was absorbed to decrease the rate of $OH^-$ ions, resulting in improved output.

TABLE 1

| | $CO_2$ conc. in supplied air [ppm] | time of 0.2 V-constant voltage [hr] | cell voltage [V] 0 A/cm² | cell voltage [V] 0.2 A/cm² | rate of counterion species [mol %] $OH^-$ | rate of counterion species [mol %] $CO_3^{2-}$ | rate of counterion species [mol %] $HCO_3^-$ |
|---|---|---|---|---|---|---|---|
| Example 1 | 250 | 0 | 0.80 | 0.12 | 0 | 0 | 100 |
| | | 2 | 0.94 | 0.35 | 0 | 81 | 19 |
| Example 2 | 80 | 0 | 0.81 | 0.14 | 0 | 0 | 100 |
| | | 2 | 0.95 | 0.41 | 50 | 50 | 0 |
| Example 3 | 0.05 | 0 | 0.84 | 0.18 | 0 | 0 | 100 |
| | | 2 | 0.99 | 0.47 | 78 | 22 | 0 |
| | | 10 | 0.98 | 0.48 | 80 | 20 | 0 |
| Example 4 | 5 | 0 | 0.81 | 0.16 | 0 | 0 | 100 |
| | | 2 | 0.98 | 0.45 | 72 | 28 | 0 |

TABLE 1-continued

| | CO$_2$ conc. in supplied air [ppm] | time of 0.2 V-constant voltage [hr] | cell voltage [V] 0 A/cm$^2$ | cell voltage [V] 0.2 A/cm$^2$ | rate of counterion species [mol %] OH$^-$ | rate of counterion species [mol %] CO$_3^{2-}$ | rate of counterion species [mol %] HCO$_3^-$ |
|---|---|---|---|---|---|---|---|
| Comp. Example 1 | 380 | 0 | 0.75 | 0.10 | 0 | 0 | 100 |
| | | 2 | 0.92 | 0.31 | 0 | 65 | 35 |
| Example 5 | 0.05 | 0 | 0.97 | 0.52 | 88 | 12 | 0 |
| | | 2 | 0.96 | 0.48 | 82 | 18 | 0 |
| Comp. Example 2 | 380 | 0 | 0.95 | 0.51 | 88 | 12 | 0 |
| | | 2 | 0.93 | 0.32 | 0 | 68 | 32 |

EXPLANATION OF SYMBOLS

1: cell bulkhead
2: fuel flow hole
3: oxidizing agent gas flow hole
4: anode
5: cathode
6: solid polymer electrolyte (anion-exchange membrane)
7: anode chamber
8: cathode chamber

The invention claimed is:

1. An operating method for an anion-exchange membrane-type fuel cell including an anion-exchange membrane-electrode assembly in which an anode is joined to one surface of an anion-exchange membrane; a cathode is joined to the other surface; air is supplied to the cathode, and at least a hydroxy-ion conducts in the anion-exchange membrane and moves into the anode, wherein:
counterion in the anion-exchange membrane at the start of operation is HCO$_3^-$, CO$_3^{2-}$ or mixture thereof; and the air supplied to the cathode is reduced in concentration of carbon dioxide.

2. The operating method for an anion-exchange membrane-type fuel cell as set forth in claim 1, wherein carbon dioxide concentration in said air supplied to said cathode is reduced to 300 ppm or less.

3. The operating method for an anion-exchange membrane-type fuel cell as set forth in claim 1, further comprising supplying fuel made of a non-carbon compound to said anode.

4. The operating method for an anion-exchange membrane-type fuel cell as set forth in claim 3, wherein said non-carbon compound is hydrogen.

5. An anion-exchange membrane-type fuel cell, comprising:
an anion-exchange membrane-electrode assembly in which an anode is joined to one surface of an anion-exchange membrane and a cathode is joined to the other surface, and
and at least a hydroxy-ion conducts in the anion-exchange membrane and moves into the anode,
wherein a counterion of said anion-exchange membrane is HCO$_3^-$, CO$_3^{2-}$ or mixture thereof at the start of operation; and
wherein the anion-exchange membrane-type fuel cell further comprises a low carbon dioxide air supply system for taking in air and supplying air after reducing a carbon dioxide concentration to the cathode.

6. An operating method for an anion-exchange membrane-type fuel cell, comprising:
joining an anode to one surface of an anion-exchange membrane of an anion-exchange membrane-electrode assembly;
joining a cathode to the other surface of the anion-exchange membrane; and
supplying air to the cathode, and
conducting at least a hydroxy-ion in the anion-exchange membrane to move into the anode,
wherein a counterion in the anion-exchange membrane at the start of operation is HCO$_3^-$, CO$_3^{2-}$ or mixture thereof, and
wherein a concentration of carbon dioxide in the air supplied to the cathode is reduced.

7. The operating method as set forth in claim 6, wherein a concentration of carbon dioxide in the air supplied to the cathode is reduced to 250 ppm or less.

8. The operating method as set forth in claim 6, wherein a concentration of carbon dioxide in the air supplied to the cathode is reduced to 100 ppm or less.

9. The operating method as set forth in claim 6, wherein a concentration of carbon dioxide in the air supplied to the cathode is reduced to 10 ppm or less.

10. The operating method as set forth in claim 6, wherein a concentration of carbon dioxide in the air supplied to the cathode is reduced to 5 to 100 ppm.

* * * * *